United States Patent [19]
Profit

[11] Patent Number: 5,807,045
[45] Date of Patent: Sep. 15, 1998

[54] INTERLOCKING FLATBED TRAILER LOAD STRAP FASTENING SYSTEM

[76] Inventor: Grant Profit, 38 West McDonald Pl, Cochrane, AB, Canada, TOL OW4

[21] Appl. No.: 813,479

[22] Filed: Mar. 7, 1997

[51] Int. Cl.[6] ..................................................... B60P 7/08
[52] U.S. Cl. .......................... 410/116; 410/97; 410/101; 410/106
[58] Field of Search ............................ 410/97, 101, 106, 410/116; 24/68 CD, 265 CD, 265 H, 698.1; 248/499

[56] References Cited

U.S. PATENT DOCUMENTS

| | | |
|---|---|---|
| 1,405,516 | 2/1922 | Humphreys . |
| 3,323,186 | 6/1967 | Rennert ..................................... 410/116 |
| 4,818,162 | 4/1989 | Zukowski et al. ....................... 410/116 |
| 5,139,375 | 8/1992 | Franchuk ................................. 410/105 |
| 5,388,938 | 2/1995 | Helton ..................................... 410/101 |
| 5,416,956 | 5/1995 | Rubin ..................................... 24/601.4 |
| 5,443,341 | 8/1995 | Hamilton ................................. 410/116 |
| 5,458,447 | 10/1995 | Clason .................................... 410/100 |
| 5,674,033 | 10/1997 | Ruegg ..................................... 410/104 |

OTHER PUBLICATIONS

Advertisement on "Tarpanlin & Tie Downs", 1 page, no date.
Advertisement Lift All Company Inc. 1 page, no date.

*Primary Examiner*—Stephen T. Gordon
*Attorney, Agent, or Firm*—David S. Thompson

[57] ABSTRACT

An interlocking flatbed trailer load strap fastening system provides a strap fastener carried by the end of a load securing strap and a fixed fastener carried by a flatbed trailer. The strap fastener may be attached to the fixed fastener only when the strap fastener is precisely rotated. The strap fastener provides a body having left and right side elements and upper and lower cross members and a curved base, together defining an upper strap opening where a load strap may be secured, and a first hook opening. Left and right prongs extending from the curved base, define a second hook opening between them. A fixed fastener provides a hook portion somewhat resembling a horse's head extending from a base permanently attached to the side of the frame of the flatbed trailer. By momentarily rotating the strap fastener, the hook portion may be inserted into the first and second hook openings. The strap fastener is then securely attached to the fixed fastener, until carefully rotated and removed.

1 Claim, 5 Drawing Sheets

INTERLOCKING FLATBED TRAILER LOAD STRAP FASTENING SYSTEM

CROSS-REFERENCES

This application is related to application Ser. No. 08/787,530 filed Jan. 23, 1997, by the same inventor.

BACKGROUND

In the trucking industry, loads are secured to flatbed trailers by straps having fasteners of different types which are used to secure the strap to the base of the trailer. Such fasteners must allow easy and rapid attachment and removal, but must not release during travel due to vibration or shifts in the load.

A common type of fastener employs a hook element which is lowered below a flat iron bar carried on the side of the flatbed trailer. The strap is then shortened, pulling the hook against the bar. However, if slack length should develop in the fastening strap, the hook may release from the bar during travel. A similar problem exists with a similar hook system that provides inverted hooks attached to the side of the trailer. When too much slack length develops in the fastening strap, the fastener may release the hook.

What is needed it an interlocking flatbed trailer load strap fastening system that prevents unwanted release during travel. In particular, the load strap fastening system must not release when some extra slack length develops in the load straps.

SUMMARY

The present invention is directed to an apparatus that satisfies the above needs. A novel interlocking flatbed trailer load strap fastening system provides a fixed fastener carried by the side of the flatbed trailer and a strap fastener, carried by the end of the load strap, that is removably attachable to the fixed fastener.

The interlocking flatbed trailer load strap fastening system 10 of the present invention provides some or all of the following structures.

(A) A strap fastener 20, adapted to be carried by the end of a load fastening strap 101, including:
  (1) A body 21, having a first hook opening 27 and a strap opening 26, the body having:
    (a) Generally parallel left and right side elements 22, 23 separated by a distance labeled 41 on FIG. 4.
    (b) An upper cross member 24, connecting the left and right side elements 22, 23.
    (c) A lower cross member 25, parallel to the upper cross member 24, connecting the left and right side elements 22, 23.
    (d) A hook support rim 28 adjacent to the first hook opening, wherein the hook support rim and the lower cross member are separated by a distance labeled 42 on FIG. 1.
  (2) A curved base 29 having a hook support edge 36, the curved base attached to the body 21.
  (3) A pair of prongs 30, including a left prong 31 and a right prong 32, extending from the curved base 29, the pair of prongs 30 and the hook support edge 36 defining a second hook opening 33. The distance labeled 43 on FIG. 8, from the base of a first prong to the upper opposite corner of the first hook opening 27, is incrementally greater than the distance labeled 70 on FIG. 5, from the nose to the ear of the hook portion of the below fixed fastener.

(B) A fixed fastener 60, adapted to be carried by a flatbed trailer and adapted to be removably attached to the strap fastener 20, the fixed fastener including:
  (1) A base 61, typically made of steel plate, suitable for attachment to a flatbed trailer.
  (2) A hook portion 63, typically made of steel plate and oriented perpendicularly to the base, suitable for attachment to the strap fastener 20, the hook portion having:
    (a) A shoulder portion 64, extending perpendicularly from the base.
    (b) A neck portion 65, connected to the shoulder portion, extending further from the base, wherein the neck has a bottom edge 69 that is supported by the hook support rim 28 and hook support edge 36 when the strap fastener 20 is attached to the fixed fastener 60.
    (c) A head portion 66, having opposed ear 67 and nose 68 ends separated by a distance labeled 70 in FIG. 5, wherein the distance 70 is less than the distance 43, allowing the strap fastener to be inserted over the head when the strap fastener is rotated. However, the distance 70 is greater than the distance 42, making it impossible to remove the strap fastener without rotating it.

It is therefore a primary advantage of the present invention to provide a novel interlocking flatbed trailer load strap fastening system that will not release during travel, even where the load strap becomes somewhat slack.

Another advantage of the present invention is to provide a novel interlocking flatbed trailer load strap fastening system that is easily fastened and unfastened by intentional movements, but is very unlikely to unfasten due to random movement.

DRAWINGS

These and other features, aspects, and advantages of the present invention will become better understood with regard to the following description, appended claims, and accompanying drawings where:

DESCRIPTION

Figure 1:
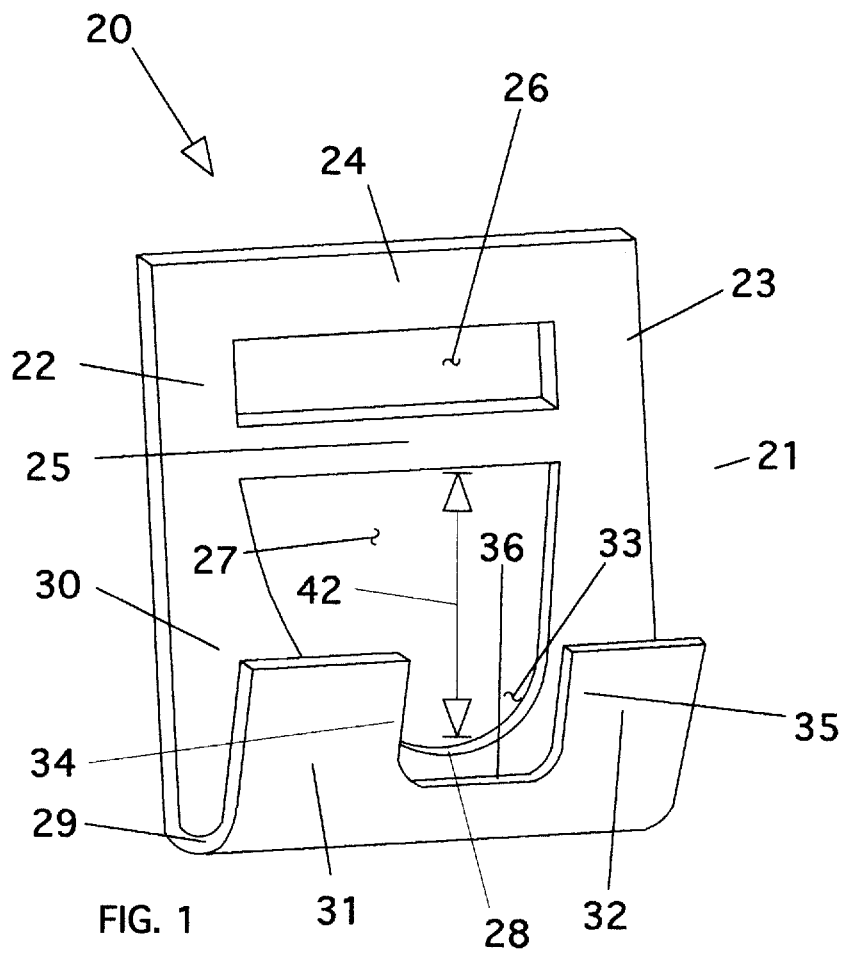
FIG. 1 is a front perspective view of a version of the strap fastener portion of the invention.

An embodiment of the fastening system 10 provides a fixed fastener 60 which is removably interlocked with a strap fastener 20. The fixed fastener 60, as seen in FIGS. 5–8, is carried by the flat iron or similar vertically oriented planar structure carried by a flatbed trailer. The strap fastener 20, as seen in FIGS. 1–5 and 8, is carried by the end of a strap 101 used to secure a load carried on the flatbed trailer. The strap fastener 20 provides a body 21 having a curved base 29 from which extend left and right prongs 31, 32. The body provides upper and lower cross members 24, 25, which allow the connection of a load-securing tie-down strap 101. A hook receiving passage 39 is formed by a first hook opening 27 in the body 21 and a second hook opening 33 between the left and right prongs. The fixed fastener 60 provides a base 61 and a hook portion 63, which may be carried by the hook receiving passage 39.

A strap fastener 20 for connecting a tie-down strap to a flatbed trailer, includes a body 21, having a first hook opening 27 and a strap opening 26. In a preferred embodiment, the first hook opening is approximately 2⅝" at its widest, at a distance labeled 41 on FIG. 4, and 1⅞" at its deepest, at a distance labeled 42 on FIG. 1. The body is approximately 3.75 inches tall and 3.75 inches wide and is made of heavy steel plate. The body also includes generally parallel left and right side elements 22, 23, which are positioned a spaced distance apart. An upper cross member 24 connects the upper ends of the left and right side elements 22, 23. A lower cross member 25, parallel to the upper cross member 24, also connects the left and right side elements 22, 23, defining the strap opening 26 between the upper and lower cross members. The body 21 also provides a hook support rim 28 adjacent to the first hook opening.

Figure 5:
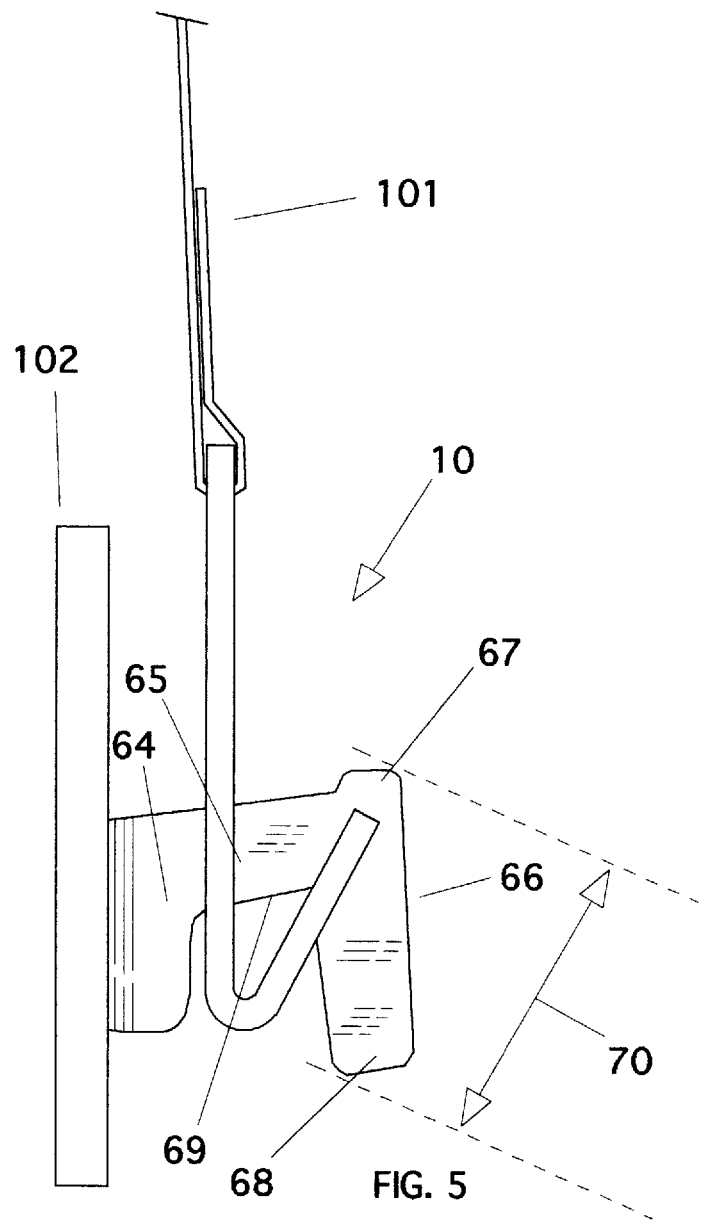
FIG. 5 is a side orthographic view of the strap fastener of FIG. 1, attached to a version of the fixed fastener of the invention having no base.
Figure 6:
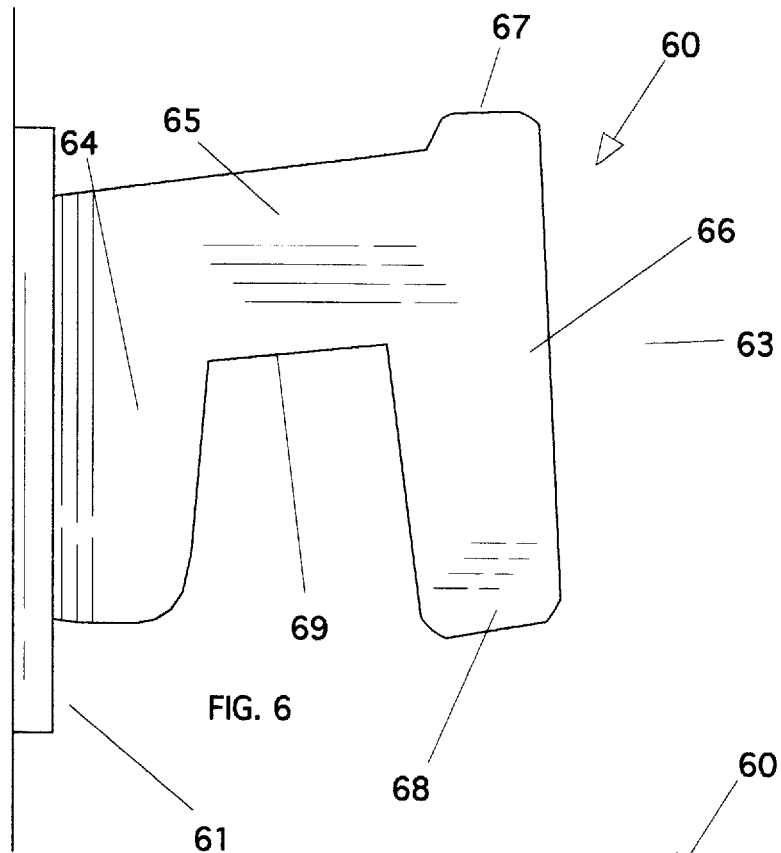
FIG. 6 is a side orthographic view of a version of the fixed fastener having a base attached to the side iron of a flatbed trailer.
Figure 7:
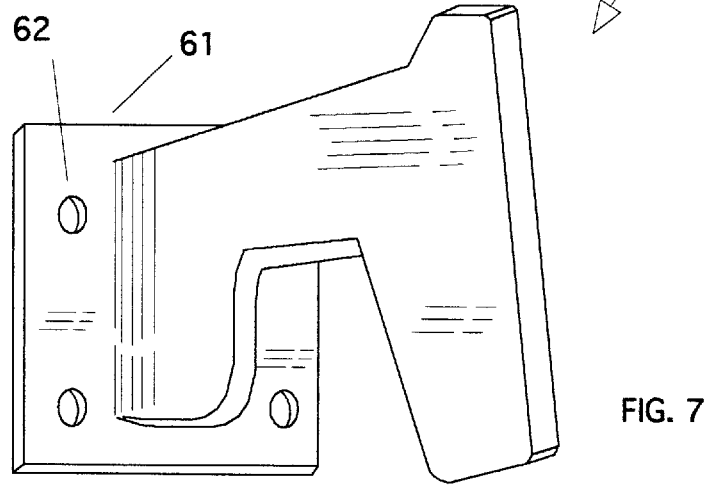
FIG. 7 is a perspective view of the fixed fastener of FIG. 6.

As seen in FIG. 5, the upper and lower cross members 24, 25, together with the strap opening 26, allow for a load securing strap 101 to be passed through strap opening 26, folded back against itself, and sewn securely in place.

The curved base 29, attached to the body 21, provides a hook support edge 36. In the preferred embodiment the base 29 is curved. In alternative embodiments, the base may be squared off. However, the fastener is typically stronger and less costly to manufacture when the base is curved.

A pair of prongs 30 extends from the curved base 29. The pair of prongs having left and right inside edges 34, 35 and the hook support edge 36 define a second hook opening 33. A hook receiving passage 39 is formed by the combined first hook opening 27 in the body 21 and the second hook opening 33 between the prongs 31, 32. The hook portion 63 of the fastener 60 is seen in FIG. 5 passing through the hook receiving passage 39.

Figure 8:
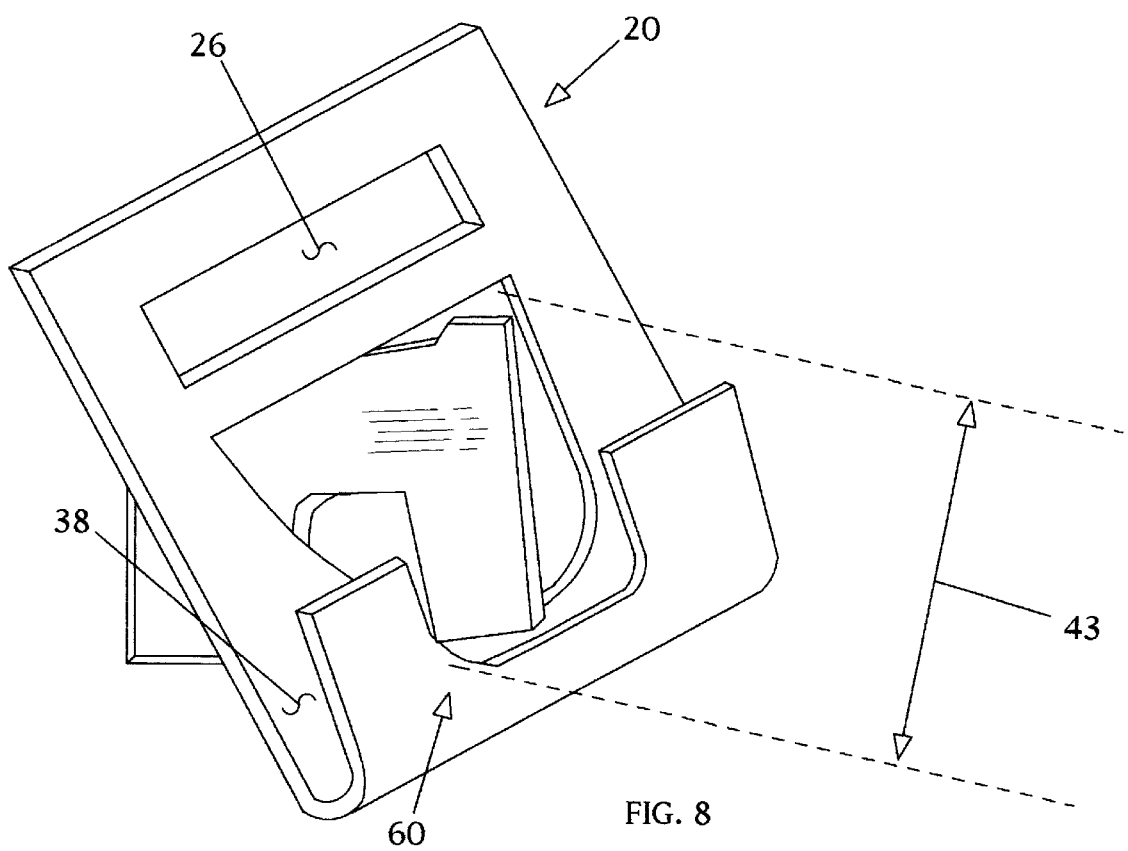
FIG. 8 is a perspective view of the fixed fastener and the strap fastener during the process of connection or removal of the strap fastener.

As seen in FIG. 8, the pair of prongs 30 together with the body 21 define a flat iron receiving channel 38. Where a fixed fastener 60 is not available or conveniently located, the flat iron receiving channel 38 of the strap fastener may be attached to the lower edge of the flat iron 102. In this case, the prongs would be upwardly oriented on the inside of the flat iron, while the body would be on the other side of the flat iron.

Figure 2:
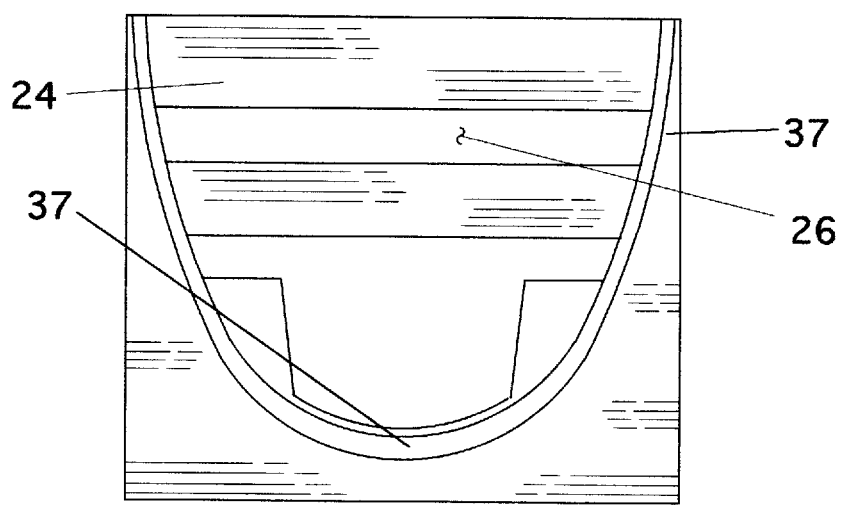
FIG. 2 is a rear orthographic view of a strap fastener having an optional reinforcement rim.
Figure 3:
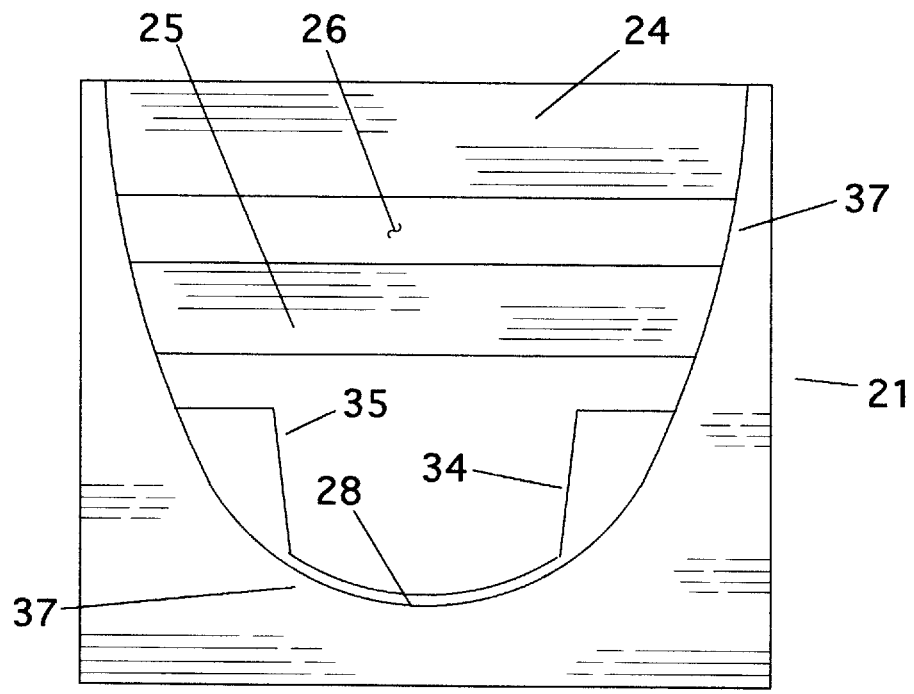
FIG. 3 is a rear orthographic view of the strap fastener of FIG. 1.
Figure 4:
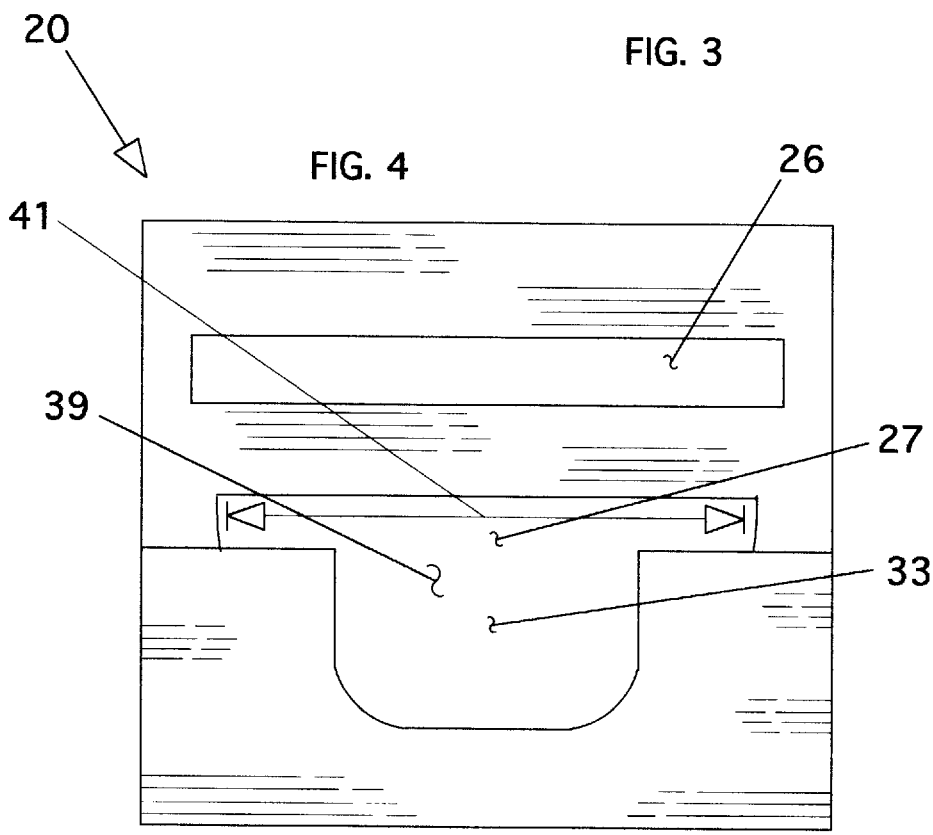
FIG. 4 is a front orthographic view of the strap fastener of FIG. 1.

As seen in FIG. 2, an optional reinforcing rim 37 may be welded in place on the back side of the body 21, thereby reinforcing the hook support rim 28 of the first hook opening 27.

As seen in FIGS. 5–8, the fixed fastener 60 provides a base 61, typically having one or more fastening holes 62. In the preferred embodiment, the base is made of 0.25" thick steel plate, 2.5" wide and 3" tall. The base is suitable for attachment to the flat iron 102 or side of a flatbed trailer, typically by either welding, bolts, screws or other fastening means.

A hook portion 63 is formed from steel plate that is 0.25" thick, and is sized and dimensioned carefully to allow releasable attachment to the strap fastener 20. The hook portion provides a shoulder portion 64 that is approximately 2" tall (parallel to the vertical long side of the base) and 1" deep (perpendicular to the surface of the base). A neck area 65 extends outwardly from the shoulder portion approximately 1", and is 1.25" tall. A head portion 66 is approximately 3⅜" long, from ear 67 to nose 68, and is attached to the neck area.

Significantly, the distance labeled 70 in FIG. 5, from the ear 67 to the nose 68 is short enough to pass through the first hook opening 27, which is defined by the left and right side elements 22, 23 and on the top by the lower cross member 25 and the bottom by the hook support rim 28. This is possible, however, only when the strap fastener is turned at approximately 45 degrees to the head 66, so that the ear 67 is adjacent to the right side element 23 and the nose 68 is adjacent to the base of the left prong 31, or visa versa. When rotated in this manner, the distance labeled 43 in FIG. 8, from the base of either prong to the upper opposite corner 40 of the first hook opening is slightly greater than the distance 70 seen in FIG. 5, from the nose 68 to the ear 67, thereby allowing the strap fastener to be attached to the fixed fastener.

Also significantly, the distance from the ear 67 to the nose 68 is greater than the distance labeled 42 in FIG. 1 between the lower cross member 25 and the hook support rim 28. As a result, the hook portion 63 will not release the strap fastener 20 unless the strap fastener is rotated.

Another aspect of the invention is that the neck 65 extends outwardly from the base 61 a distance that is approximately equal to the distance between the prongs 31, 32 and the side elements 22, 23. As a result, when the strap fastener and the fixed fastener are connected, the bottom of the neck 69 contacts the hook support rim 28 and the hook support edge 36, as seen in FIG. 5.

A further aspect of the invention is that, when the strap fastener 20 and the fixed fastener 60 are connected, the ear 67 tends to contact the lower cross member 25 if the strap 101 moves outwardly from the trailer. Similarly, the prongs 31, 32 prevent the head 66 from moving from side-to-side. As a result, the strap fastener and fixed fasteners will not inadvertently become unfastened.

The strap fastener 20 is also usable with conventional downwardly directed hooks used on flatbed trailers. However, use with this type of hook does not provide the resistance to unwanted release that is the case when used with the fixed fastener 60. When the strap fastener 20 is used with a conventional hook, the hook passed through the hook receiving passage 39.

As seen in FIG. 5, a version of the invention allows attachment of the shoulders 64 directly to the flat iron 102 or other supporting surface by welding or other means. In this version of the invention, the shoulders portion 64 may be somewhat thicker, to support the hook portion 63 and any associated load.

To use the interlocking truck load strap fastening system 10, the load-securing strap 101 is installed on the strap fastener 20, as seen in FIG. 5. The fixed fastener 60 is fastened to the side of a flatbed trailer, typically to the flat irons 102 that run along the sides of such trailers. The fixed fastener is oriented in the manner seen in FIG. 5.

A strap 101 is attached to the upper cross member 24 of the strap fastener 20, as seen in FIG. 5.

The strap 101 is then positioned over the load carried by the trailer. The strap fastener is then connected to the fixed fastener. By rotation of the strap fastener, the nose of the fixed fastener is inserted through the first and second hook openings 27, 33, as seen in FIG. 8. In ear 67 is guided into the upper corner 40, requiring a 45 degree rotation of the strap fastener. After the ear passes through the upper corner, the strap fastener may be rotated until the upper cross member 24 is level.

The strap fastener may be removed by reversing the above steps.

It is therefore a primary advantage of the present invention to provide a novel interlocking flatbed trailer load strap fastening system that will not release during travel, even where the load strap becomes somewhat slack.

Another advantage of the present invention is to provide a novel interlocking flatbed trailer load strap fastening system that is easily fastened and unfastened by intentional movements, but is very unlikely to unfasten due to random movement.

In compliance with the U.S. Patent Laws, the invention has been described in language more or less specific as to methodical features. The invention is not, however, limited to the specific features described, since the means herein disclosed comprise preferred forms of putting the invention into effect. The dimensions given for the various components are to be considered only to be those of a preferred version of the invention, and it is understood that other similar dimensions would also be suitable. In particular, the relative dimensions of the various components are of greater importance than the absolute dimensions. The invention is, therefore, claimed in any of its forms or modifications within the proper scope of the appended claims appropriately interpreted in accordance with the doctrine of equivalents.

What is claimed is:

1. An interlocking truck load strap fastening system, adapted to releasably fasten a load-securing tie-down strap to a flatbed trailer frame, the fastening system comprising:
   (A) a strap fastener, adapted to be carried by an end of a load fastening strap, comprising:
      (1) a body, having a first hook opening and a strap opening, the body comprising:
         (a) generally parallel left and right side elements;
         (b) an upper cross member, connecting the left and right side elements;
         (c) a lower cross member, parallel to the upper cross member, connecting the left and right side elements; and
         (d) a hook support rim adjacent to the first hook opening, wherein the hook support rim and the lower cross member are a separated by a first distance;
      (2) a curved base having a hook support edge, the curved base attached to the body; and
      (3) a pair of prongs, extending from the curved base, the pair of prongs and the hook support edge defining a second hook opening, wherein a first prong of the pair of prongs and an upper opposite corner of the first hook opening are separated by a second distance; and
   (B) a fixed fastener, adapted to be carried by a frame of a flatbed trailer and adapted to be removably attached to the strap fastener, the fixed fastener comprising:
      (1) a base, adapted for attachment to a flatbed trailer; and
      (2) a hook portion, adapted for attachment to the strap fastener, the hook portion comprising:
         (a) a shoulder portion, extending perpendicularly from the base;
         (b) a neck portion, connected to the shoulder portion, wherein the neck has a bottom edge that is in contact with the hook support rim and hook support edge when the strap fastener is attached to the fixed fastener; and
         (c) a head portion, having opposed ear and nose ends, wherein the ear and nose ends are separated by a third distance, and wherein the third distance is less than the second distance, allowing the strap fastener to be inserted over the head portion when the strap fastener is rotated, but less than the first distance, thereby making it impossible to remove the strap fastener without rotating it.

* * * * *